US008670462B2

(12) United States Patent
Shuta

(10) Patent No.: US 8,670,462 B2
(45) Date of Patent: Mar. 11, 2014

(54) INFORMATION PROCESSING APPARATUS, INFORMATION PROCESSING METHOD AND INFORMATION PROCESSING PROGRAM

(75) Inventor: Tomohiro Shuta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 13/211,793

(22) Filed: Aug. 17, 2011

(65) Prior Publication Data

US 2012/0063470 A1  Mar. 15, 2012

(30) Foreign Application Priority Data

Sep. 10, 2010  (JP) ................................. 2010-202996
Nov. 19, 2010  (JP) ................................. 2010-258662

(51) Int. Cl.
    *H04J 3/24* (2006.01)
(52) U.S. Cl.
    USPC ............ 370/474; 370/473; 370/475; 370/476
(58) Field of Classification Search
    USPC ........................................................ 370/474
    See application file for complete search history.

(56) References Cited

U.S. PATENT DOCUMENTS

| 6,467,008 | B1 * | 10/2002 | Gentry et al. ................. 710/261 |
| 6,714,553 | B1 * | 3/2004 | Poole et al. .................... 370/412 |
| 6,895,019 | B2 * | 5/2005 | Gibson et al. ................. 370/473 |
| 7,516,335 | B2 * | 4/2009 | Watanabe ...................... 713/300 |
| 7,962,606 | B2 * | 6/2011 | Barron et al. ................. 709/224 |
| 8,089,645 | B2 * | 1/2012 | Soda ............................. 358/1.14 |
| 8,214,676 | B2 * | 7/2012 | Katoh ........................... 713/324 |
| 8,248,934 | B2 * | 8/2012 | Kosbab et al. ................ 370/231 |
| 8,370,483 | B2 * | 2/2013 | Choong et al. ................ 709/224 |
| 8,375,108 | B2 * | 2/2013 | Aderton et al. ............... 709/220 |
| 2005/0216776 | A1 | 9/2005 | Watanabe |
| 2007/0070895 | A1 * | 3/2007 | Narvaez ........................ 370/230 |
| 2007/0168545 | A1 * | 7/2007 | Venkatsubra et al. ........ 709/236 |
| 2008/0195688 | A1 * | 8/2008 | Watanabe ..................... 709/201 |
| 2011/0126195 | A1 * | 5/2011 | Tsirkin ............................. 718/1 |
| 2011/0320617 | A1 * | 12/2011 | Annamalaisami et al. ... 709/228 |

FOREIGN PATENT DOCUMENTS

| JP | 2005-269103 | 9/2005 |
| JP | 2008-305209 | 12/2008 |
| JP | 2009-029102 | 2/2009 |
| JP | 2009-049699 | 3/2009 |
| JP | 2010-166313 | 7/2010 |

* cited by examiner

*Primary Examiner* — Ian N Moore
*Assistant Examiner* — Lakeram Jangbahadur
(74) *Attorney, Agent, or Firm* — IPUSA, PLLC

(57) ABSTRACT

An information processing apparatus includes a receiving part receiving a packet from a communication line; an arithmetic processing part configured to stop an operation in an energy conservation mode, a filter part configured to allow a response required packet to pass through the filter part; a packet retaining part retaining the packet passing over the filter part; and a power source administrating part activating the arithmetic processing part by supplying electric power when the packet is received by the receiving part, wherein if the packet retaining part retains an incomplete packet at a time of activating the arithmetic processing part, the arithmetic processing part generates a packet information piece associating the incomplete packet and a corresponding complete packet as a list and stores the packet information piece to a list storing part.

13 Claims, 16 Drawing Sheets

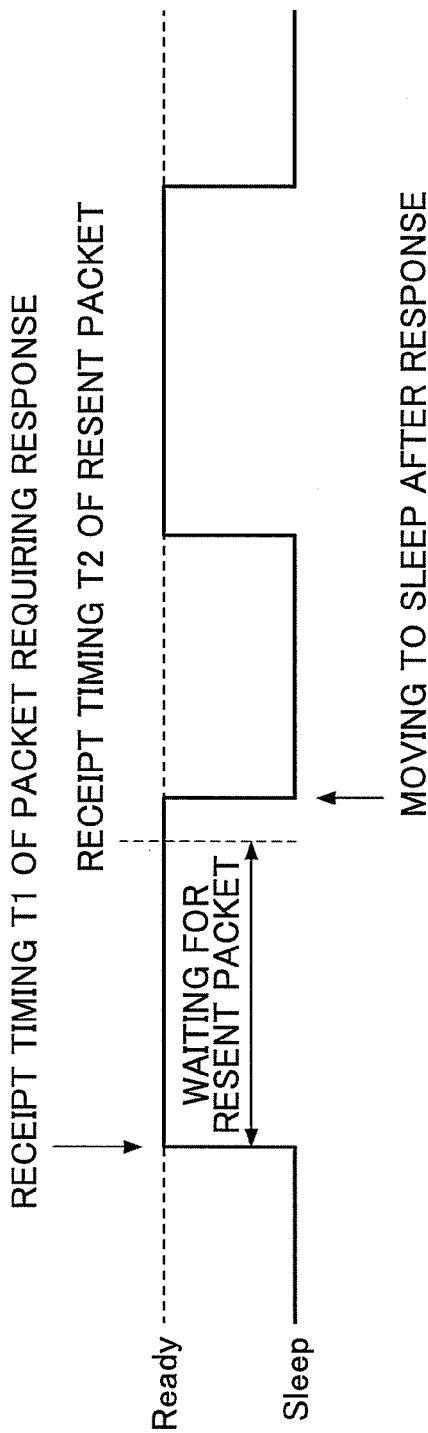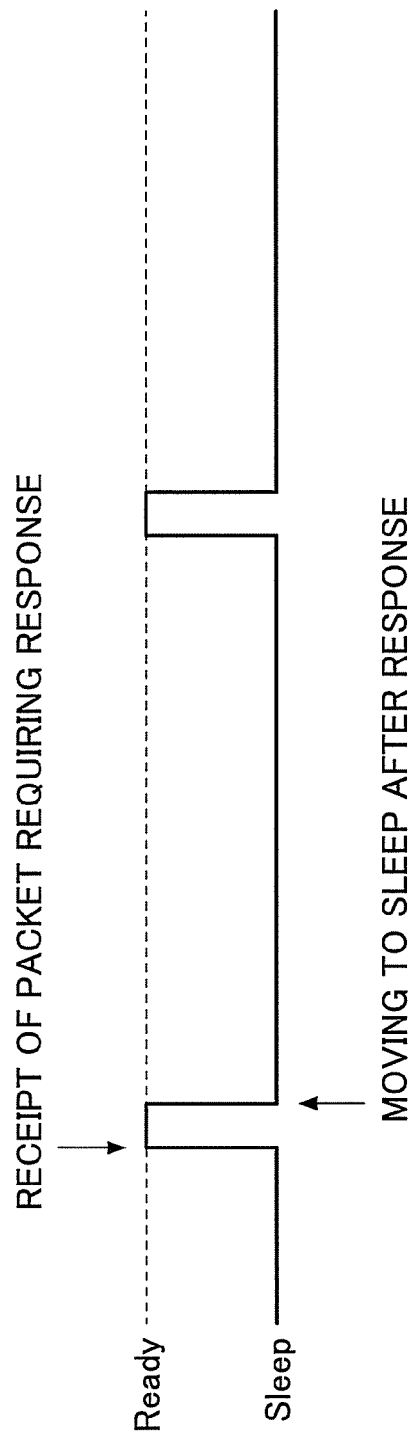

PACKET 10 | PACKET 20 | A PART OF PACKET 30 (650)

INFORMATION PROCESSING APPARATUS, INFORMATION PROCESSING METHOD AND INFORMATION PROCESSING PROGRAM

BACKGROUND OF THE INVENTION

1. Field of the Invention

The present invention generally relates to an information processing apparatus including a receiving part and an arithmetic processing part, an information processing method and an information processing program for processing in the information processing apparatus.

2. Description of the Related Art

As an example, an image processing apparatus may be connected to plural terminal apparatuses via a network. The plural image processing apparatuses can use the image processing apparatus in common. Signals are frequently sent to a communication line for the image processing apparatus used by the plural terminal apparatuses in common.

The image processing apparatus may reduce power consumption by setting the CPU in an energy conservation mode in order to reduce the power consumption during a standby state where image processing operations are not carried out.

The image processing apparatus connected to the network is required to respond to a specific packet among various packets sent and received in the network. Therefore, the CPU is required to respond via the network even if the CPU is in an energy conservation mode.

Therefore, the sent packets are filtered to ignore a response required part of the packets and to respond to a response unrequired part of the packets with the CPU. Thus, the power consumption is reduced when the CPU responds only to the necessary part of the packets. Patent Document 1 discloses an information processing apparatus which can respond to packets arrived from a network while maintaining an energy conservation mode.

Patent Document 2 discloses a method of turning on or off a filter function of a network control unit in association with a state of a power source of a controller.

Patent Document 1: Japanese Laid-Open Patent Application No. 2009-29102

Patent Document 2: Japanese Laid-Open Patent Application No. 2009-49699

SUMMARY OF THE INVENTION

Accordingly, embodiments of the present invention provide a novel and useful information processing apparatus, information processing method and information processing program solving one or more of the problems discussed above.

One aspect of the embodiments of the present invention may be to provide an information processing apparatus including a receiving part configured to receive a packet from a communication line; an arithmetic processing part configured to stop an operation in an energy conservation mode; a filter part configured to allow a packet, to which a response is required, to pass through the filter part; a packet retaining part configured to retain the packet passing over the filter part; and a power source administrating part configured to activate the arithmetic processing part by supplying electric power to the arithmetic processing part when the packet is received by the receiving part, wherein if the packet retaining part retains an incomplete packet, a portion of which is lost, at a time of activating the arithmetic processing part, the arithmetic processing part generates a packet information piece, in which the incomplete packet and a corresponding complete packet containing the incomplete packet are associated with each other as a list and stores the packet information piece to a list storing part.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 8A illustrates a transition of a state from an energy conservation mode to a normal mode of Embodiment 1.

FIG. 8B illustrates a transition of the state from the energy conservation mode to the normal mode of Embodiment 1.

DETAILED DESCRIPTION OF THE PREFERRED EMBODIMENTS

A description is given below, with reference to the FIG. 1 through FIG. 16 of embodiments of the present invention.

Reference symbols typically designate as follows:

100: image processing system;
200: image processing apparatus;
210,210A: SoC;
230: RAM;
232: packet list area;
260: PHY;
600: wakeup control circuit;
610: packet filter;
620: gate;
630: wakeup control unit;
640: power source control unit;
650: packet retaining function unit; and
660,660A: packet analyzing unit.

In the energy conservation mode, the electric power consumption is aimed at achieving a minimum power consumption. Therefore, a circuit for responding to the packets in the energy conservation mode may have a necessarily minimal configuration.

If hardware cannot automatically respond to packets, it is necessary to analyze the sent packets by recovering the CPU. However, when the CPU recovers, the packet is not retained. Therefore, it is necessary to wait for resending of a packet after the CPU has recovered. Therefore, the response requires time.

It can be considered to install a memory for storing packets until the CPU is recovered. However, if the capacity of the memory is increased, a circuit configuration is enlarged to thereby increase power consumption.

In an information processing apparatus of the embodiment, power consumption can be reduced by decreasing a memory capacity which temporarily retains received packets under an energy conservation mode. When the packets retained in the memory are incomplete, a list in which the incomplete packets are associated with the complete packets is generated. By reading the complete packets from the list when similar packets are received the next time, a quick response is enabled after recovery of a CPU. Hereinafter, an image processing apparatus is exemplified as an information processing apparatus.

Embodiment 1

Figure 1:
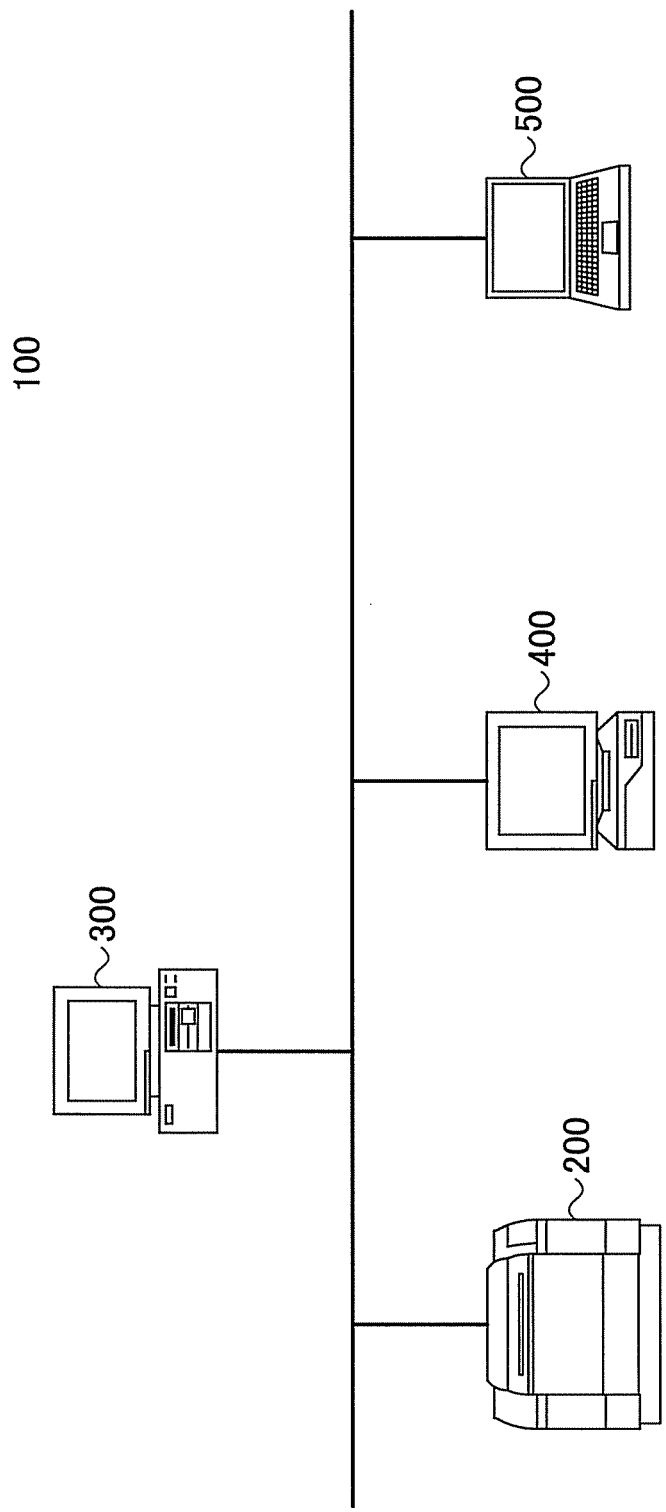
FIG. 1 illustrates a system structure of an image processing apparatus of Embodiment 1.

Embodiment 1 of the present invention is described in reference of figures. FIG. 1 illustrates a system structure of the image processing apparatus of Embodiment 1.

The image processing system 100 is formed by an image processing apparatus 200, a host computer 300, and other user terminals 400 and 500, connected by a network. Print data are sent from the host computer 300 to the image processing apparatus 200 via a network circuit. As soon as the print data are received from the image processing apparatus 200, printing is immediately started. The host computer 300 periodically inquires of the connected apparatuses via the network to monitor the connected apparatuses. The connected apparatuses respond to the inquiry. Then, it is recognized by the host computer 300 that the connected apparatuses are properly connected to the network.

Figure 2:
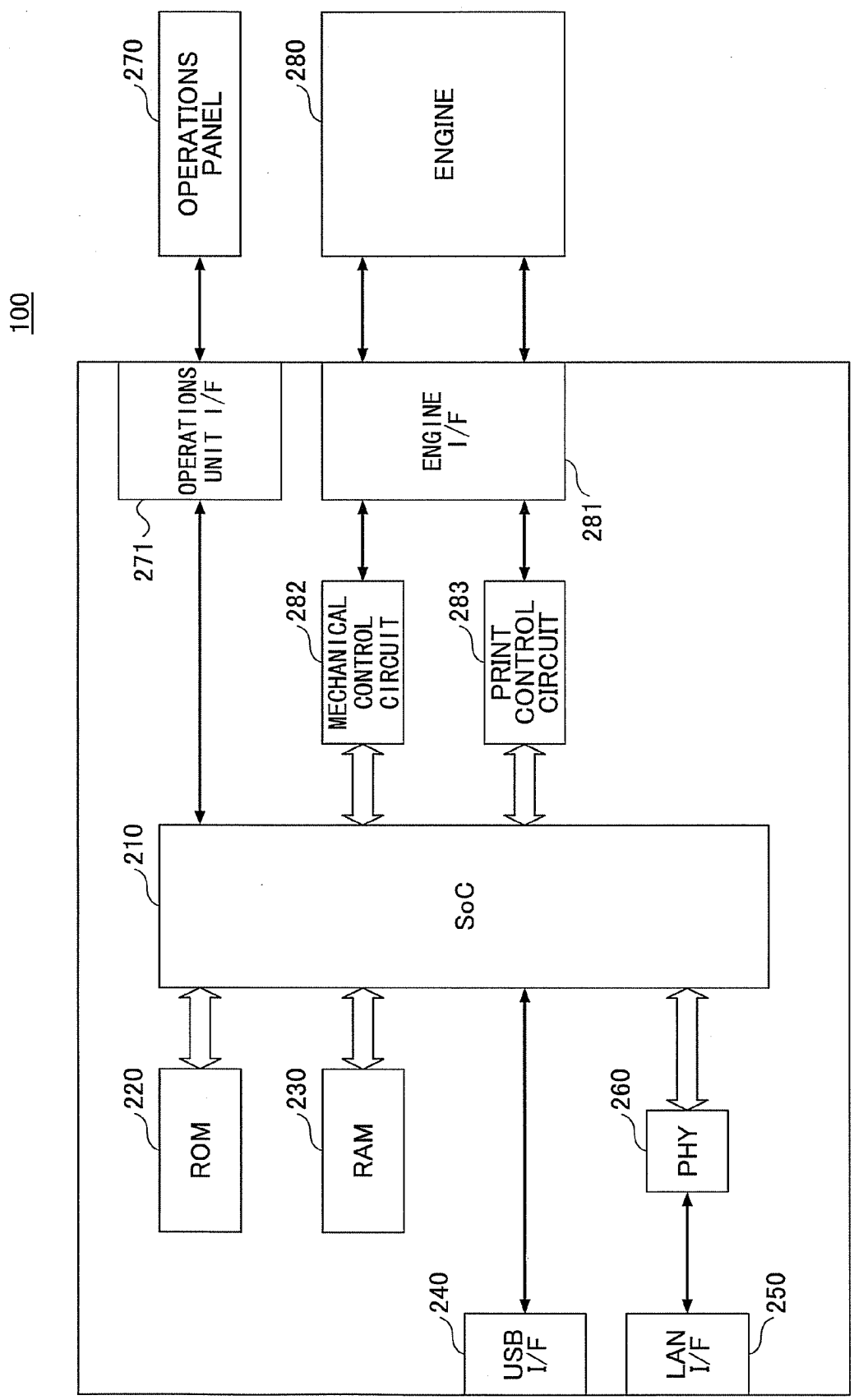
FIG. 2 is a block chart of a circuit for controlling the image processing apparatus of Embodiment 1.

FIG. 2 is a block chart of a circuit for controlling the image processing apparatus of Embodiment 1. The image processing apparatus 200 includes a System-on-a-Chip (SoC) 210, a Read Only Memory (ROM) 220, a Random Access Memory (RAM) 230, Universal Serial Bus (USB) interface 240, Local Area Network (LAN) interface 250, PHYsical Layer (PHY) 260, an operations panel 270, an engine 280, an operation unit interface (I/F) 271, an engine interface 281, a mechanical control circuit 282, and a print control circuit 283.

The SoC 210 may be any one of a CPU, a circuit for controlling the image processing apparatus, and a Large Scale Integration (LSI) in which a circuit processing print data is a single chip. The SoC 210 controls all operations of the image processing apparatus 200. The ROM 220 stores information of firmware and an image processing apparatus 200. The RAM 230 stores image data, programs or the like. A program for operating the image processing apparatus 200 may be stored in the RAM 230. The program for operating the image processing apparatus 200 may be stored in a recording medium connected via the USB interface 240 or the RAM 230. The program may be downloaded from the network via the LAN interface and stored by the RAM 230.

The RAM 230 may be a Dynamic Random Access Memory (DMA). By setting the RAM 230 to be in a self refresh mode during an energy conservation mode, the stored data and programs are retained. The DRAM periodically requires precharging. A mode of carrying out operation of the periodical precharging is referred to as a self refresh mode. Even though a device connected to the RAM 230 may not always operate, data stored in the RAM 230 is retained in the self-refresh mode.

The USB interface 240 receives print jobs (image data) or the like from the host computer 300. The LAN interface 250 is a connection interface that receives the print jobs (the image data) or the like from the host computer 300.

The PHY 260 mutually converts data and electric signals. The data are received from or sent to the communication line such as the network. The operations panel 270 detects operation requests from a user and displays a message to the user. The operations unit I/F 271 is an interface to the operations panel 270. The engine 280 includes a mechanism and a print control unit of the image processing apparatus 200. The mechanical control circuit 282 controls the mechanism of the engine 280. The print control circuit 283 controls the print control unit of the engine 280.

Figure 3:
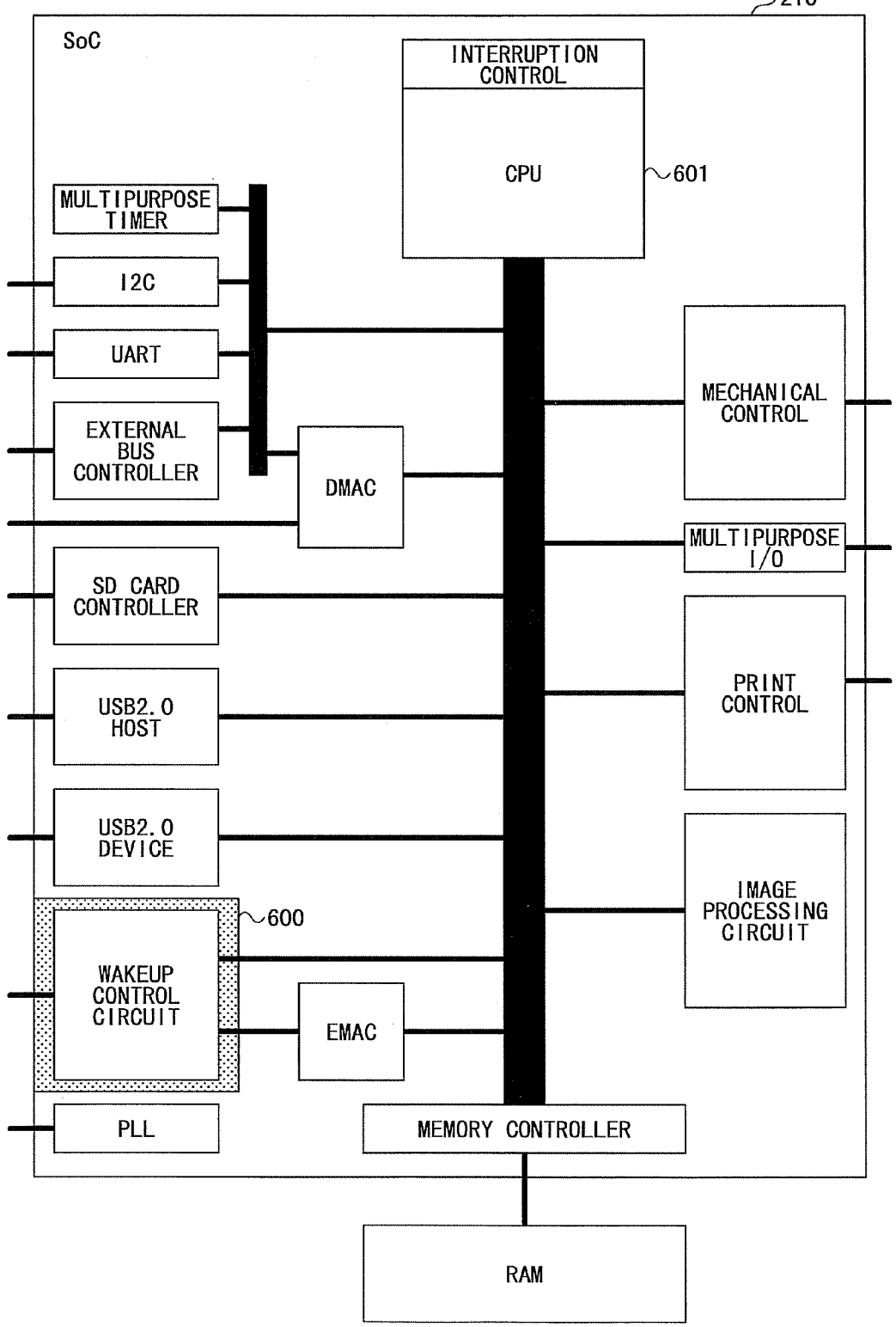
FIG. 3 illustrates a structure of SoC of the Embodiment 1.

FIG. 3 illustrates a structure of SoC of Embodiment 1. The power source of the SoC 210 of Embodiment 1 is separated to the reduce power consumption of the image processing apparatus 200 in the energy conservation mode.

The SoC 210 of Embodiment 1 is divided into two blocks of the wakeup control circuit 600 and the other circuit. The power source supplies power only to the wakeup control circuit 600 and not to the other circuit (shut down). With Embodiment 1, the power is supplied only to the wakeup control circuit 600 in the energy conservation mode. Further, although the power source of the SoC 210 is divided into the two blocks between the wakeup control circuit 600 and the other circuit 600 including the CPU 601 with Embodiment 1, the present invention is not limited to the structure. The power source of the SoC 210 may be divided into three or more blocks in response to the system requirement.

Figure 4:
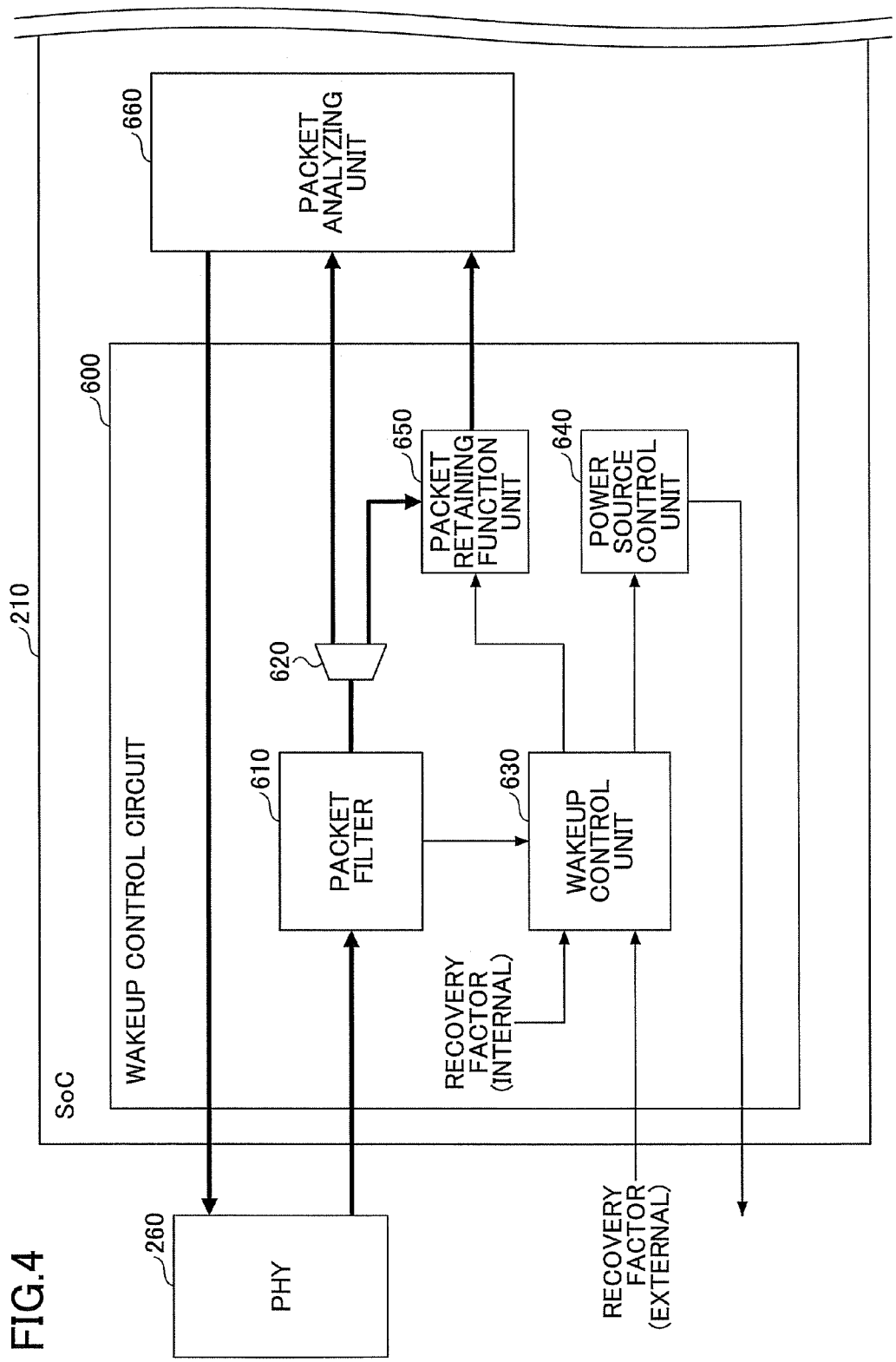
FIG. 4 is a block chart of a wakeup control circuit of Embodiment 1.

FIG. 4 is a block chart of the wakeup control circuit of Embodiment 1. The wakeup control circuit 600 includes a packet filter 610, a gate 620, a wakeup control unit 630, a power source control unit 640 and a packet retaining function unit 650. The packet output from the wakeup control circuit 600 is sent to the packet analyzing unit 660. The packet analyzing unit 660 may be a part of the functions of the CPU 601.

The packet filter 610 of Embodiment 1 determines whether the received packet is a response required packet to which a response is required or a response unrequired packet to which a response is not required. If the received packet is the response unrequired packet, the response unrequired packet is disposed of. If the received packet is the response required packet, the response required packet is allowed to pass therethrough. Patterns of the response required packets may be previously set in the packet filter 610 of Embodiment 1.

After the packet filter 610 allows the response required packet to pass through the packet filter 610, the packet filter 610 controls the gate 620 so that the response required packet is stored in the packet retaining function unit 650.

The packet filter 610 instructs the wakeup control unit 630 to recover the circuit other than the wakeup control circuit 600. The wakeup control unit 630 receives the instruction and instructs the power source control unit 640 to supply the power of the circuit other than the wakeup control circuit 600.

The packet filter 610 of Embodiment 1 controls the gate 620 to send the response required packet directly to the packet analyzing unit 660 if the response required packet is sent in the normal mode (not the energy conservation mode). In the normal mode, the power is supplied to the entire circuit inside the SoC 210.

The packet retaining function unit 650 is a memory for retaining a packet with which the circuit other than the wakeup control circuit 600 is recovered.

In Embodiment 1, if the packet requiring response is sent and the size of the packet requiring response is greater than the capacity of the packet retaining function unit 650, only a portion of the packet requiring response which can be stored in the packet retaining function is retained. Therefore, there is a probability that only an incomplete packet in which a part of the packet is lost is retained in the packet retaining function unit 650.

In the image processing apparatus 200 of Embodiment 1, a packet list indicating packets with which the SoC 210 is recovered from the energy conservation mode to the normal mode is made and stored and accumulated in the RAM 230.

In Embodiment 1, when the incomplete packet is retained in the packet retaining function unit 650 in the energy conservation mode, the packet list is referred to in order to quickly restore the incomplete packet to the complete packet.

It is preferable to secure a minimum area necessary for a program, printing and enabling setting of a packet list area which stores the packet list. When many packets are required to be listed, the packet list area may be set wider.

With Embodiment 1, by providing the packet list area in the RAM 230, the data area may be reduced thereby decreasing the print speed. In order to deal with this, it is preferable use the RAM 230 whose capacity can be increased.

Figure 5:
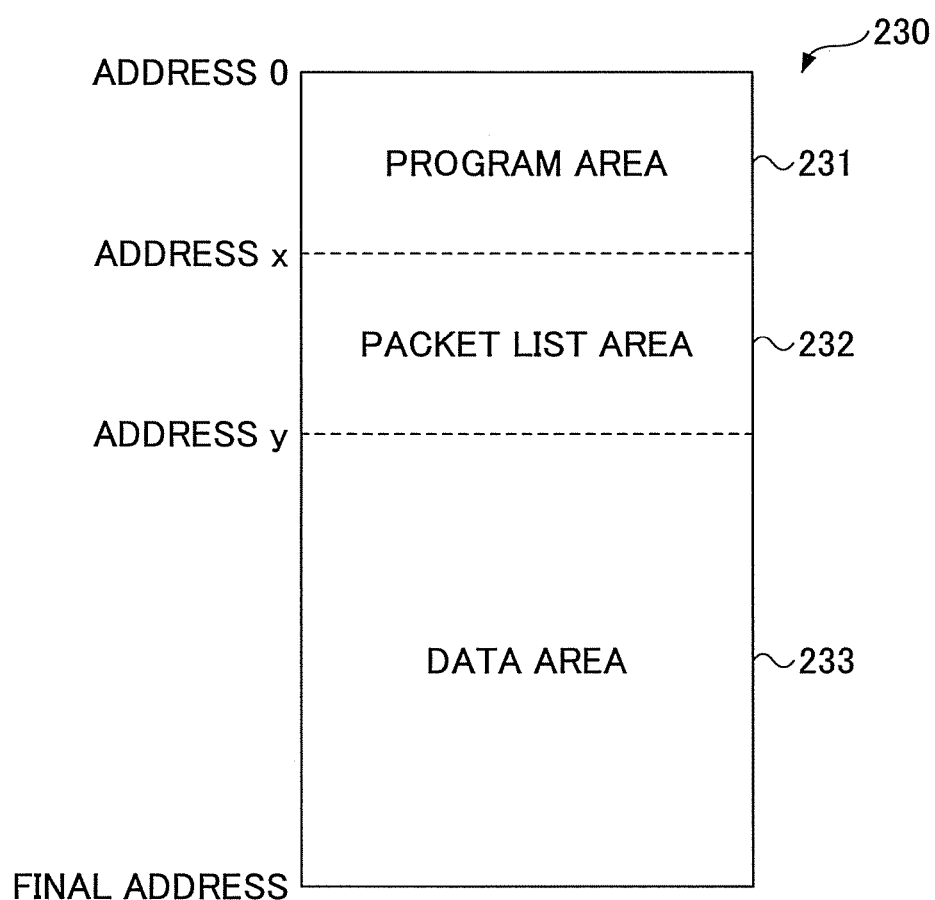
FIG. 5 illustrates an example of an address map of RAM of Embodiment 1.

Referring to FIG. 5, the RAM 230 of Embodiment 1 is described. FIG. 5 illustrates an example of an address map of RAM of Embodiment 1.

The RAM 230 includes a program area 231, a packet list area 232 and a data area 233. The program area 231 stores a program for operating the image processing apparatus 200 and print data received by the image processing apparatus 200. A list of response required packets to which the SoC 210 are required to respond are stored in the packet list area 232. Detailed description of the packet list is described later. Data necessary for execution of the program stored in the program area 231 are stored in the data area 233.

With Embodiment 1, the capacity of the packet area 232 can be changed. For example, by changing an address indicative of a range of the packet list area set in the program area 231, the capacity of the packet list area 232 can be changed. The capacity of the packet list area 232 may be changed via the operations panel 270.

With Embodiment 1, the capacity of the packet list area 232 may be set to be an appropriate range in consideration of a use environment of the image processing apparatus 200. If the kinds of the packets received by the image processing apparatus 200 are many, the capacity of the packet list area 232 is increased, and if the kinds are little, the capacity of the packet list area 232 is decreased.

Figure 6:
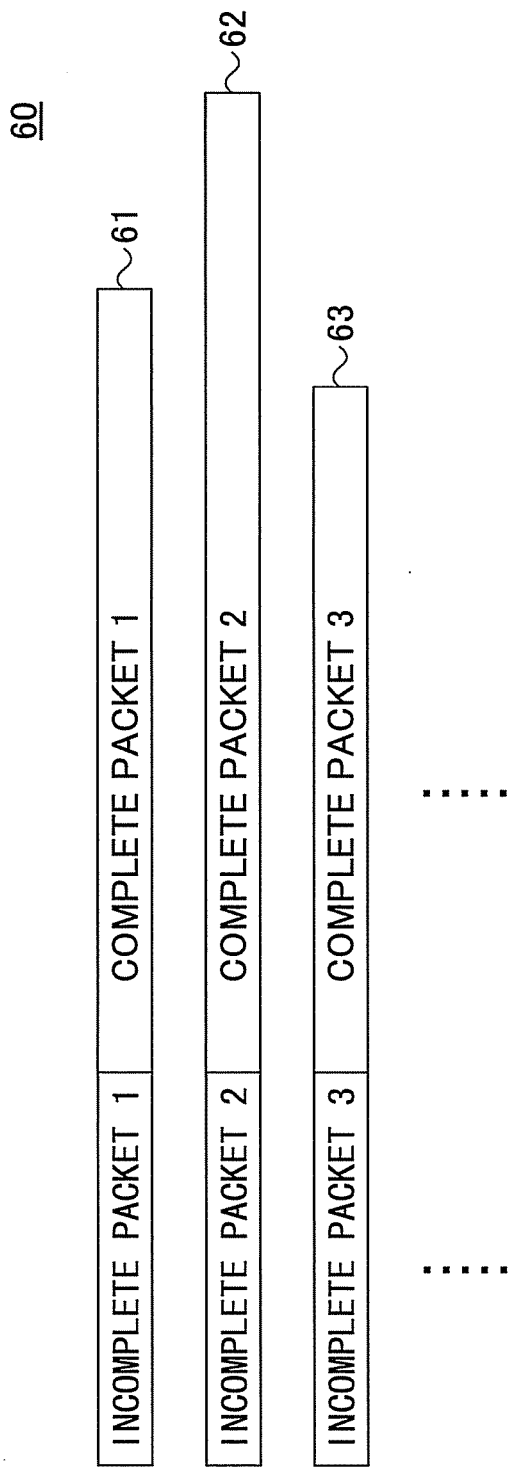
FIG. 6 illustrates the structure of a packet list of the Embodiment 1.

Referring to FIG. 6, the packet list of Embodiment 1 is described. FIG. 6 illustrates an example packet list of the Embodiment 1.

The incomplete packets and the complete packets are associated with each other and stored in the packet list 60 of Embodiment 1. Referring to FIG. 6, INCOMPLETE PACKET 1 and COMPLETE PACKET 1 restored from INCOMPLETE PACKET 1 are associated with each other in a packet information piece 61. INCOMPLETE PACKET 2 and COMPLETE PACKET 2 restored from INCOMPLETE PACKET 2 are associated with each other in a packet information piece 62. INCOMPLETE PACKET 3 and COMPLETE PACKET 3 restored from INCOMPLETE PACKET 3 are associated with each other in a packet information piece 63. COMPLETE PACKET 1 may include INCOMPLETE PACKET 1.

If the capacity of the packet retaining function unit 650 is 32 bytes and packets whose size are more than the capacity are sent, the packets of 32 bytes are retained and the remaining packets of 96 bytes are not retained. Therefore, the packets of 32 bytes are retained in the packet retaining function unit 650 as the incomplete packets. Then, the packets of 128 bytes are resent as complete packets. The complete packets of 128 bytes are associated with the incomplete packets of 32 bytes and described in a packet list. By referring to the packet list, the complete packets of 128 bytes can be searched from the incomplete packets of 32 bytes.

The packet information piece of Embodiment 1 associates the incomplete packet with the complete packet restored from the complete packet. However, the present invention is not limited thereto. The packet information piece may contain the information indicative of a frequency of receiving the packets and information indicative of a time when the packet information piece is first stored in the packet list 60.

The information indicative of the frequency of receiving the packets may be a number of times of receiving the incomplete packets 1 within a predetermined time period or a time when the last packet 1 is received. With Embodiment 1, when the predetermined time period elapses after a packet information piece was first stored in the packet list 60, that packet information piece may be deleted.

Figure 7:
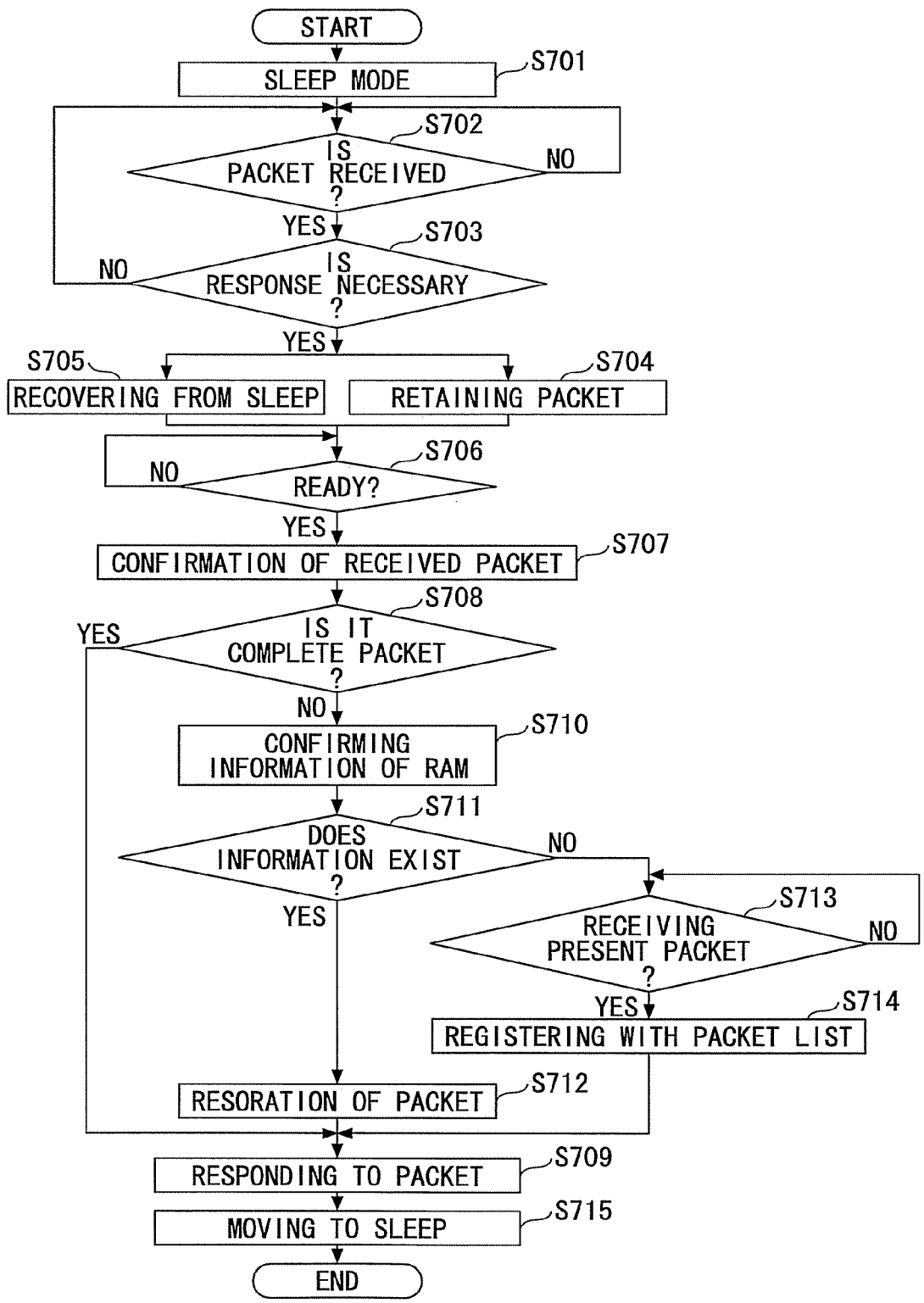
FIG. 7 illustrates an operation of the SoC of Embodiment 1.

Referring to FIG. 7, an operation of the SoC of Embodiment 1 is described. FIG. 7 illustrates an operation of the SoC of Embodiment 1. Referring to FIG. 7, the SoC 210 is started up from the energy conservation mode.

If the image processing apparatus 200 is in the energy conservation mode in step S701, the power to circuits of the SoC other than the wakeup control circuit 600 is shut off. The power is supplied to the wakeup control circuit 600 so that the packets are received by the wakeup control circuit 600 in step S702.

In step S702, when the packets are received from the network, the packet filter 610 determines whether the received packet is a packet requiring response in step S703. If the response is not required in NO of step S703, the sent packet is disposed of and a packet to be sent next is waited for.

If it is determined that the received packet is the packet requiring response in YES of step S703, the received packet is retained in the packet retaining function unit 650. Simultaneously, the wakeup control unit 630 and the power source control unit 640 instruct the SoC 210 to be recovered from the energy conservation mode to the normal mode in step S705.

If the SoC 210 is instructed to be recovered from the energy conservation mode to the normal mode, the wakeup control unit 630 and the power source control unit 640 control to supply the power to circuits other than the wakeup control circuit 600.

If the entire SoC 210 is supplied with the power to be recovered from the energy conservation mode to the normal mode in YES of step S706, the CPU 601 reads the packets stored in the packet retaining function unit 650 and confirms the packet in step S707.

If the packet read out of the packet retaining function unit 650 is a complete packet having no defect in YES of step S708, the CPU 601 sends the read out packet to the packet analyzing unit 660 and responds to the packet in step S709.

If the packet read out in step S708 is the incomplete packet having a defect, the CPU 601 confirms the packet list 60 stored in the packet list area 232 of the RAM 230 in step S710.

It is determined whether a packet information piece corresponding to the incomplete packet read out of the packet retaining function unit 650 is stored in the packet list 60 in step S711.

If the packet information piece corresponding to the incomplete packet read out of the packet retaining function unit 650 exists in the packet list 60 in YES of step S711, the CPU 601 reads out the complete packet corresponding to the incomplete packet from the packet list 60. Thereafter, the packet is restored in step S712.

If the corresponding packet information piece does not exist in the packet list 60, the CPU 601 waits for the resending of the packet in step S713. After the CPU 601 receives the resent packet in step S713, the CPU 601 generates an packet information piece by associating the incomplete packet read out in the step S707 and the resent packet received in step S713 and registers the packet information piece with the packet list 60 in step S714. Since the CPU 601 is recovered to the normal mode in step S713, the resent packets are received as complete packets having no defect irrespective of the size of the packets.

After the packet information piece is registered with the packet list 60 in step S714, the CPU 601 moves to step S709 and responds to the packets. After the response to the packet is completed, the CPU 601 again moves to the energy conservation mode in step S715.

As described, a once received incomplete packet is associated with the complete packet which is received after the SoC is recovered to the normal mode and retained as the packet information piece in the packet list area 232 provided in the RAM 230. Thus, the packet information piece is accumulated in the packet list area 232. The resent complete packet may include the incomplete packet. With Embodiment 1, if the same packet is sent again, the complete packet can be read out of the packet list 60 of the RAM 230 without waiting for resending of the packets. Thus, the CPU 601 can quickly respond to the packets.

FIG. 8A and FIG. 8B explain a transition from the energy conservation mode to the normal mode of Embodiment 1. FIG. 8A illustrates a state transition in an image processing apparatus without having a packet retaining function unit and a packet list. FIG. 8B illustrates a state transition of the image processing apparatus of Embodiment 1.

Referring to FIG. 8A, if the image processing apparatus receives packets from the network and it is determined that the response is required by the packet filter, the image processing apparatus is recovered from the energy conservation mode. However, in an image processing apparatus having no packet retaining function unit, a received packet is not retained and a packet analyzing unit cannot receive a packet until the image processing apparatus is recovered from an energy conservation mode. If there is no response, the packet is resent. Therefore, the image processing apparatus having no packet retaining function unit waits for a resent packet and responds to the resent packet.

Referring to FIG. 8A, it is necessary to maintain the normal mode between a timing T1 when the packet requiring response is received and a timing T2 when the resent packet is received. Because it becomes necessary to maintain the normal mode of the CPU, average power consumption increases. Further, when plural host computers are connected to the network, it is assumed that packets are simultaneously sent by the plural host computers to prevent the CPU from moving to the energy conservation mode.

On the contrary, referring to FIG. 8B, the image processing apparatus 200 includes a packet retaining function unit 650 and a packet list 60. Therefore, if the packet filter 610 determines that the response is required, the CPU 601 searches the packet list 60. If a packet information piece corresponding to an incomplete packet in the packet retaining function unit 650 exists in the packet list 60, a complete packet is sent to the packet analyzing unit 660 without waiting for a resent packet.

Therefore, the image processing apparatus 200 of Embodiment 1 is free from the waiting time of the resent packet between the timing T1 and the timing T2 illustrated in FIG. 8A. Thus, it is possible to quickly respond to the received packet. Further, in the image processing apparatus 200 of Embodiment 1, a time period of maintaining the energy conservation mode can be prolonged. Therefore, the power consumption can be reduced.

Embodiment 2

Next, Embodiment 2 of the present invention is described in reference of figures. With Embodiment 2, an incomplete packet whose packet information piece stored in a packet list is incomplete is associated with a response packet corresponding to a complete packet restored from the incomplete packet. The association with the response packet in Embodiment 2 is different from the association with the complete packet in Embodiment 1.

With Embodiment 2, only portions different from Embodiment 1 are described. Reference symbols are used for portions the same as those of Embodiment 1, and description of these portions are omitted.

Figure 9:
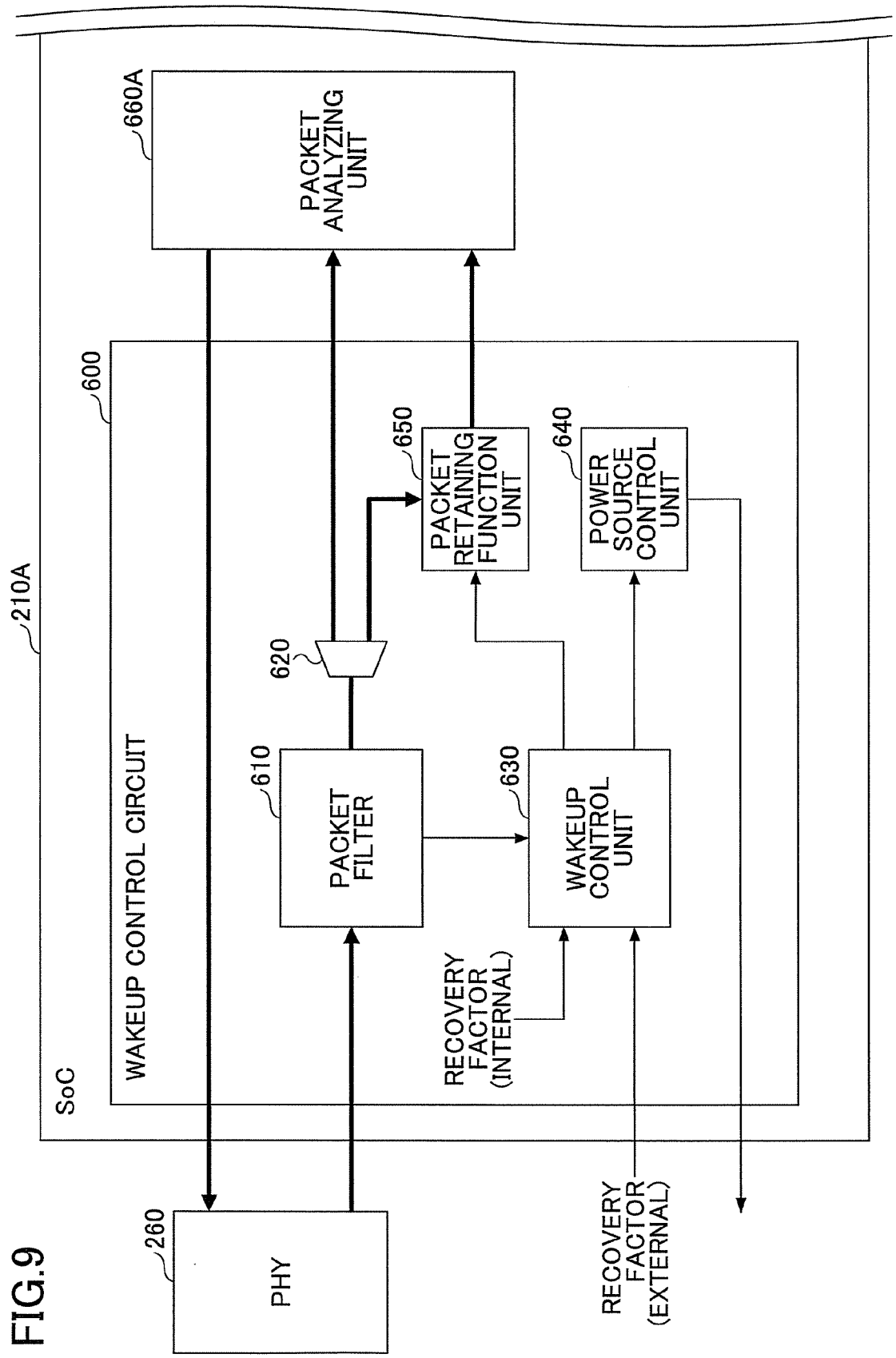
FIG. 9 illustrates a structure of the SoC of Embodiment 2.

FIG. 9 illustrates a structure of SoC of Embodiment 2. The SoC 210A of Embodiment 2 includes a packet analyzing unit 660A. The packet analyzing unit 660A of Embodiment 2 determines an incomplete packet and a response packet corresponding to the incomplete packet. The packet analyzing unit 660A stores a packet information piece in which the incomplete packet and the response packet are associated.

If the packet analyzing unit 660A cannot determine the response packet in association with the incomplete packet, the packet analyzing unit 660A waits for a complete packet to be resent and determines the response packet corresponding to the resent complete packet.

Figure 10:
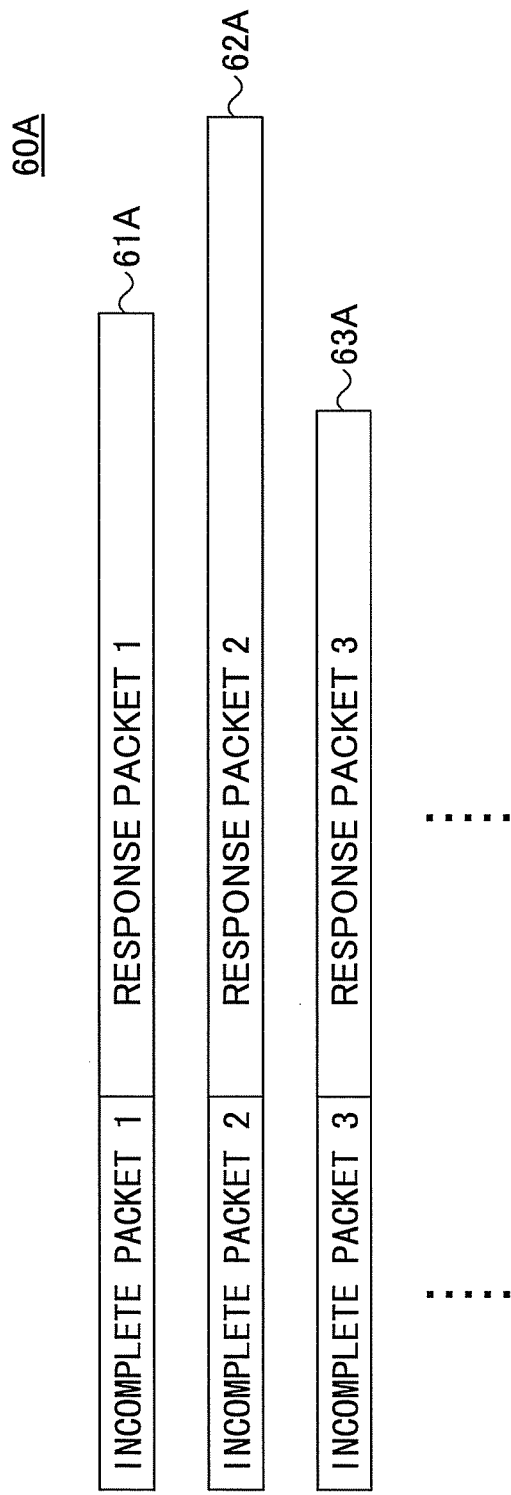
FIG. 10 illustrates an example packet list of Embodiment 2.

FIG. 10 illustrates an example packet list of the Embodiment 2. In the packet list 60A of Embodiment 2, a packet information piece 61A in which INCOMPLETE PACKET 1 is associated with a response packet 1, a packet information piece 62A in which an incomplete packet 2 is associated with the response packet 2, and a packet information piece 63A in which an incomplete packet 3 is associated with the response packet 3 are stored.

With Embodiment 2, the incomplete packets and the response packets corresponding to the incomplete packets are listed to enable a quick return of the response packets even if the packets are incomplete.

With Embodiment 2, if the packet analyzing unit 660A can analyze the response packet corresponding to the incomplete packets, the packet analyzing unit 660A associates the incomplete packet with the response packets to make the packet information piece.

If the size of a packet for querying apparatus information of the image processing apparatus 200 from a host side is larger than the capacity of the packet retaining function unit 650, the packet retained in the packet retaining function unit 650 becomes an incomplete packet whose query cannot be known. The apparatus information is an option such as a network address and an installed option. The packet analyzing unit 660A analyzes the incomplete packet. If the content of the query can be analyzed, the response packet is prepared.

Figure 11:
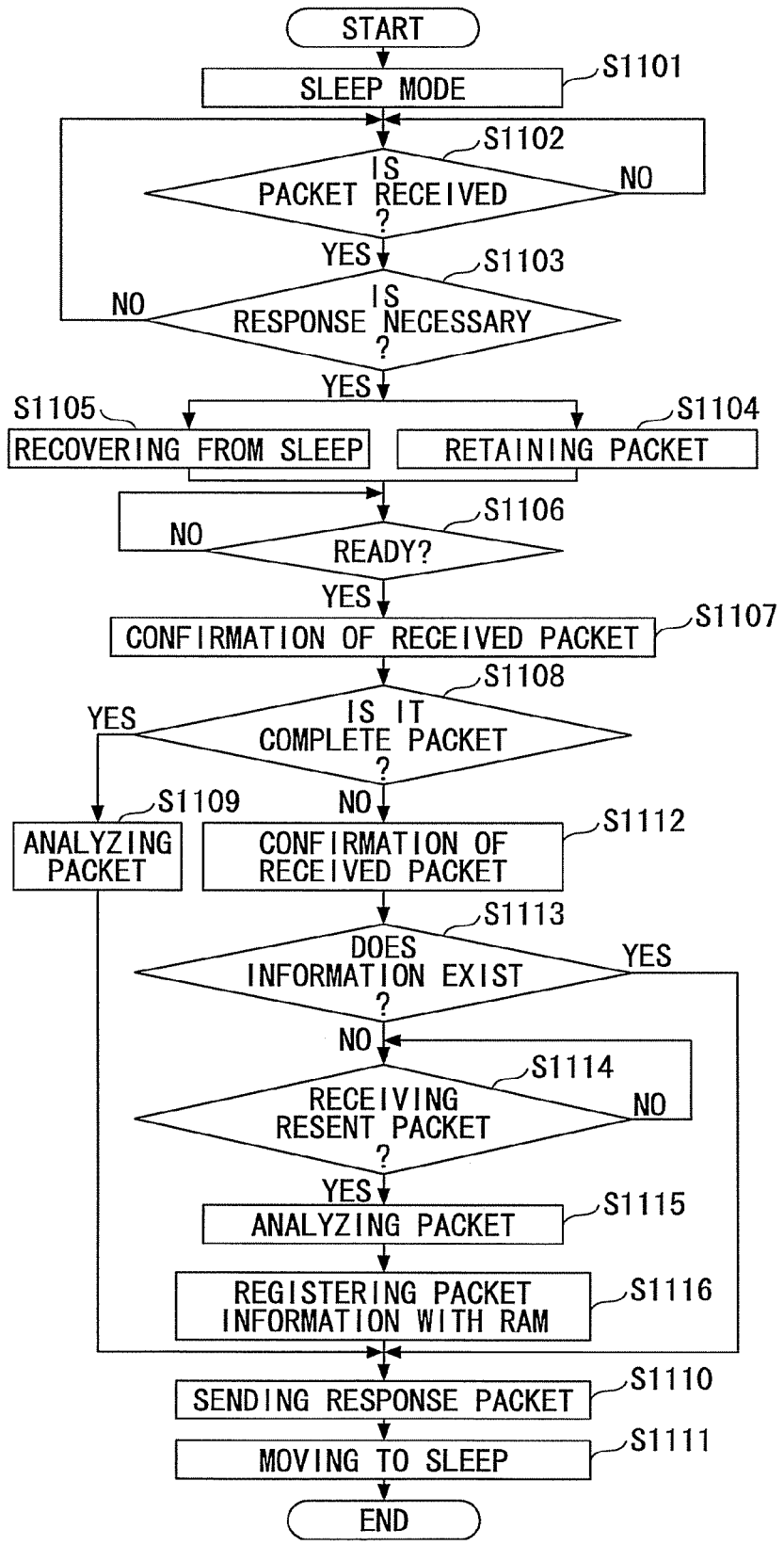
FIG. 11 illustrates an operation of an SoC of Embodiment 2.

Referring to FIG. 11, an operation of the SoC of Embodiment 2 is described. FIG. 11 illustrates the operation of the SoC of Embodiment 2. Referring to FIG. 11, the SoC 210A is started up from the energy conservation mode.

The process between step S1101 and step S1108 is similar to the process between step S701 and step S708. Therefore, a description is omitted.

In step S1108, if the packet read out of the packet retaining function unit 650 is a complete packet, the packet analyzing unit 660A analyzes the packet in step S1109 and sends the corresponding packet. After the response packet is sent in step S1110, the CPU 601 again moves to the energy conservation mode in step S1111.

In NO of step S1108, if the packet read out of the packet retaining function unit 650 is an incomplete packet, the CPU 601 determines whether the response packet corresponding to the incomplete packet read out of the packet retaining function unit 650 is stored in the packet list 60A in step S1113.

In YES of step S1113, if the response packet corresponding to the packet list 60A exists, the CPU 601 proceeds to step S1110.

If a corresponding response packet does not exist in the packet list 60A in step S1113, the CPU 601 waits for resending of the packet in step S1114. If the resent packet is received in step S1114, the CPU 601 analyzes the resent packet resent by the packet analyzing unit 660A and determines the response packet in step S1115.

The packet analyzing unit 660A generates the packet information piece in which the incomplete packet read out in step S1107 and the determined response packet are associated and registers the generated packet in formation piece with the packet list 60A is step S1116. After the registration of the generated packet information piece in the packet list 60A, the CPU 601 goes to step S1110.

As described above, in Embodiment 2, if the packet retained in the packet retaining function unit 650 is the incomplete packet, as long as the response packet corresponding to the packet list 60A is stored, the response packet can be immediately sent to the host side without waiting for resending of the packet. Further, in the image processing apparatus 200 of Embodiment 1, a time period of maintaining the energy conservation mode can be prolonged. Therefore, the power consumption can be reduced.

Figure 12:
FIG. 12 illustrates an example state in which plural packets are retained in a packet retaining function unit of Embodiment 2.

In Embodiment 2, plural packets may be retained in the packet retaining function unit 650. FIG. 12 illustrates an example state in which plural packets are retained in a packet retaining function unit of Embodiment 2.

In an example of FIG. 12, packets 10, 20 and 30 are stored in the packet retaining function unit 650. The sizes of the packets 10 and 20 are small, and the packets 10 and 20 are complete packets. The packet 30 is an incomplete packet. The packet 30 is stored in a region of the packet retaining function unit 650 remaining after the packets 10 and 20 are stored.

In this case, the packet analyzing unit 660A of Embodiment 2 determines whether a response packet corresponding to the packet 30 exists in the packet list 60A. The packet analyzing unit 660A sends a response packet if the response packet corresponding to the packet list 60A exists, and waits for resending of the packet 30 if the response packet corresponding to the packet list 60A does not exist.

In Embodiment 2, plural packets may be retained in the packet retaining function unit 650 as described.

Embodiment 3

Next, Embodiment 3 of the present invention is described in reference of figures. In Embodiment 3, a time when the packet information piece is registered with the packet list. This feature differs from Embodiment 2. In Embodiment 3, only portions different from Embodiment 1 are described. Reference symbols are used for portions the same as those of Embodiment 2, and description of these portions are omitted.

Figure 13:
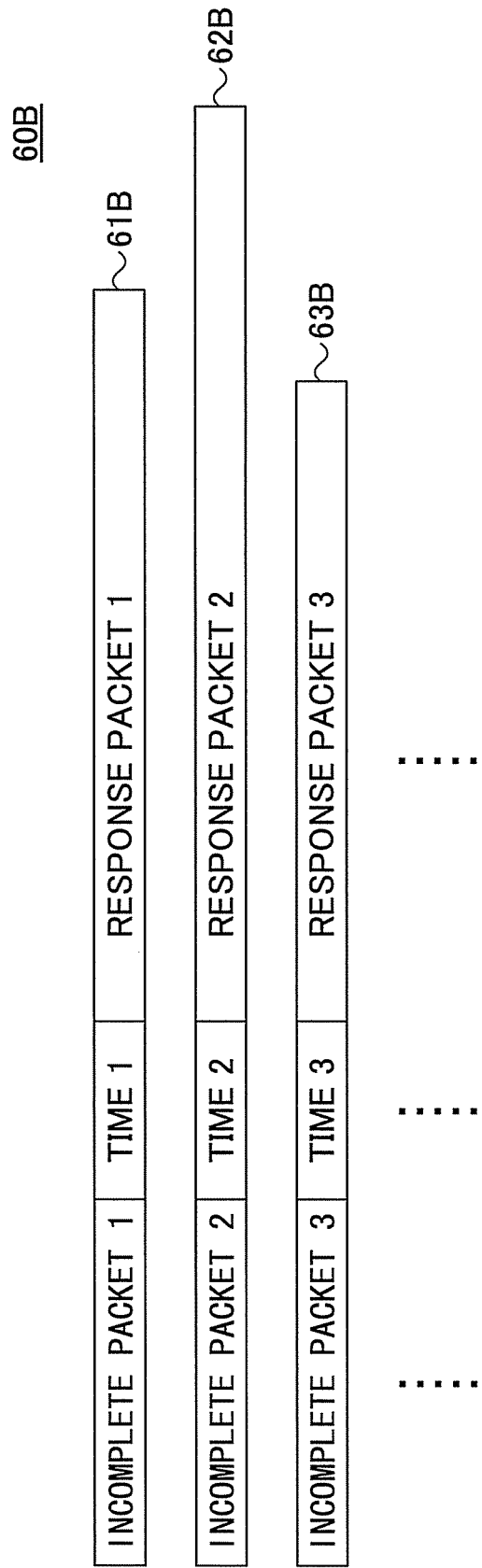
FIG. 13 illustrates an example packet list of Embodiment 3.

FIG. 13 illustrates an example packet list of Embodiment 3. With Embodiment 3, the packet analyzing unit 660A registers not only the incomplete packets and the response packets corresponding to the incomplete packets but also time information indicative of a registration time with the packet list.

The packet list 60B of Embodiment 3 stores a packet information piece 61B, a packet information piece 62B and a packet information piece 63B. In the packet information piece 61B, INCOMPLETE PACKET 1, RESPONSE PACKET 1 and TIME 1 when the packet information piece 61B is registered with the packet list 60B are associated. In the packet information piece 62B, INCOMPLETE PACKET 2, RESPONSE PACKET 2 and TIME 2 when the packet information piece 62B is registered with the packet list 60B are associated. In the packet information piece 63B, INCOMPLETE PACKET 3, RESPONSE PACKET 3 and TIME 3 when the packet information piece 62B is registered with the packet list 60B are associated.

The time information of Embodiment 3 may be a current time acquired by a calendar function of the image processing apparatus 200. If the calendar function is not installed in the image processing apparatus 200, time information may be obtained by recording a counter value of a timer and measuring an elapsed time.

With Embodiment 3, it is possible to determine whether the information registered with the packet list 60B is new information by registering the time when the packet information piece is registered with the packet list 60B. With Embodiment 3, the SoC 210A can automatically update the packet list 60B by deleting the packet information piece which has been registered with the packet list 60B before a predetermined time period. The predetermined time period can be arbitrarily set.

Figure 14:
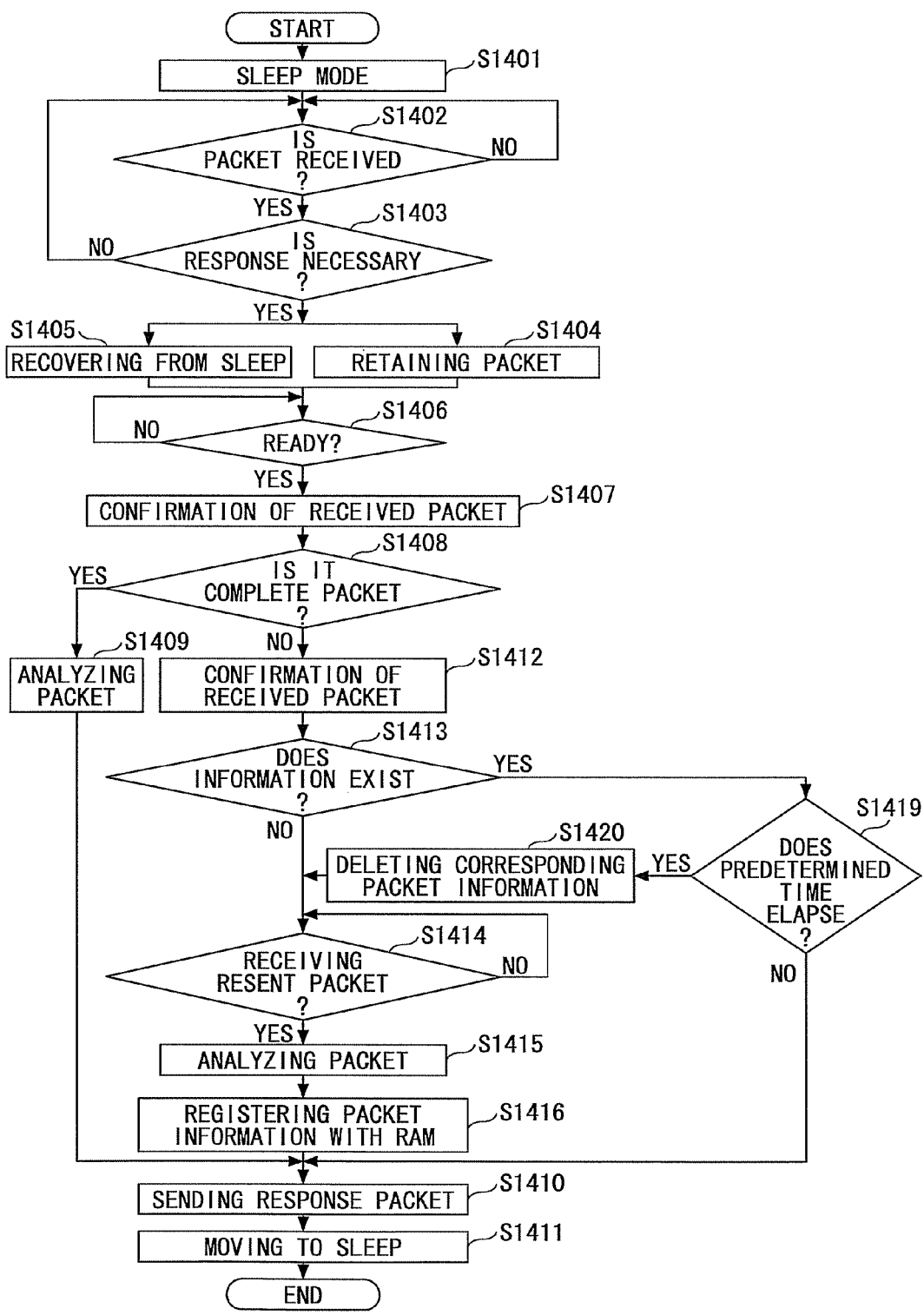
FIG. 14 illustrates an operation of an SoC of Embodiment 3.

FIG. 14 illustrates an operation of the SoC of Embodiment 3. The process between step S1401 and step S1416 in FIG. 14 is similar to the process between step S1101 and step S1116 in FIG. 11. Therefore, a description is omitted.

If the response packet corresponding to the packet list 60B exists in YES of step S1413, the packet analyzing unit 660A checks the time when the packet information piece containing the incomplete packet read out in step S1407 is registered with the packet list 60B. The packet analyzing unit 660A determines whether a predetermined time elapses after the registration of the packet information piece in the packet list 60B in step S1417.

If the predetermined time does not elapse in NO of step S1417, the packet analyzing unit 660A goes to step S1410. If the predetermined time elapses in YES of step S1417, the packet analyzing unit 660A deletes the corresponding packet information piece from the packet list 60B in step S1418 and goes back to step S1414.

With the above structure, the packet list 60B can be periodically updated.

For example, if the query of a packet received by the SoC 210A is a residual quantity of ink or toner, the content of a response packet needs to be changed in response to the query. With Embodiment 3, by periodically updating the packet list 60B, the response packet corresponding to the query can be quickly sent to the host side.

Embodiment 4

Next, Embodiment 4 of the present invention is described in reference of figures. Frequencies of using packet information pieces are stored in the packet list in Embodiment 4. Storing the frequencies is a difference from Embodiment 3. In Embodiment 4, only portions different from Embodiment 3 are described. Reference symbols are used for portions the same as those of Embodiment 3, and description of these portions are omitted.

Figure 15:
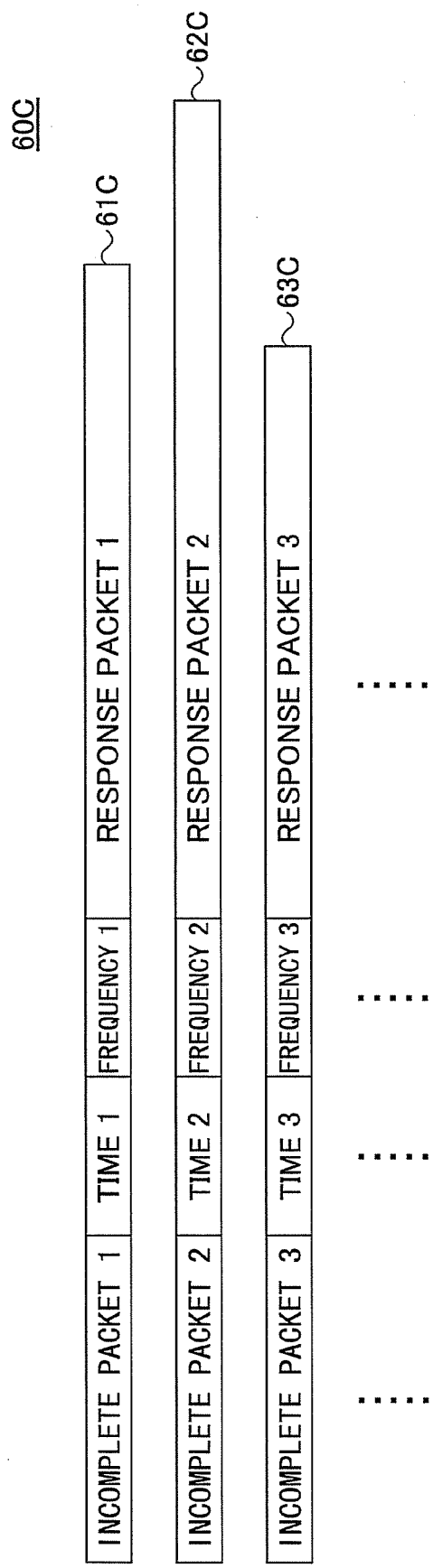
FIG. 15 illustrates an example packet list of Embodiment 4.

FIG. 15 illustrates an example packet list of the Embodiment 4. With Embodiment 4, the packet analyzing unit 660A registers not only the incomplete packets and the response packets corresponding to the incomplete packets but also time information indicative of a registration time and frequencies of using packet information pieces with the packet list. The frequencies of using the packet information pieces may be acquired by counting a time of referring to the packet information pieces within a predetermined time.

A packet list 60C of Embodiment 4 stores a packet information piece 61C, a packet information piece 62C and a packet information piece 63C. In the packet information piece 61C, INCOMPLETE PACKET 1, RESPONSE PACKET 1, TIME 1 and FREQUENCY 1 indicative of a frequency of using the packet information piece 61C are associated. In the packet information piece 62C, INCOMPLETE PACKET 2, RESPONSE PACKET 2, TIME 2 and FREQUENCY 2 indicative of a frequency of using the packet information piece 62C are associated. In the packet information piece 63C, INCOMPLETE PACKET 3, RESPONSE PACKET 3, TIME 3 and FREQUENCY 3 indicative of a frequency of using the packet information piece 63C are associated.

With Embodiment 4, by storing the frequencies of using the packet information pieces in the packet list 60C, it is possible to determine whether the incomplete packets contained in the packet information pieces are frequently sent.

Figure 16:
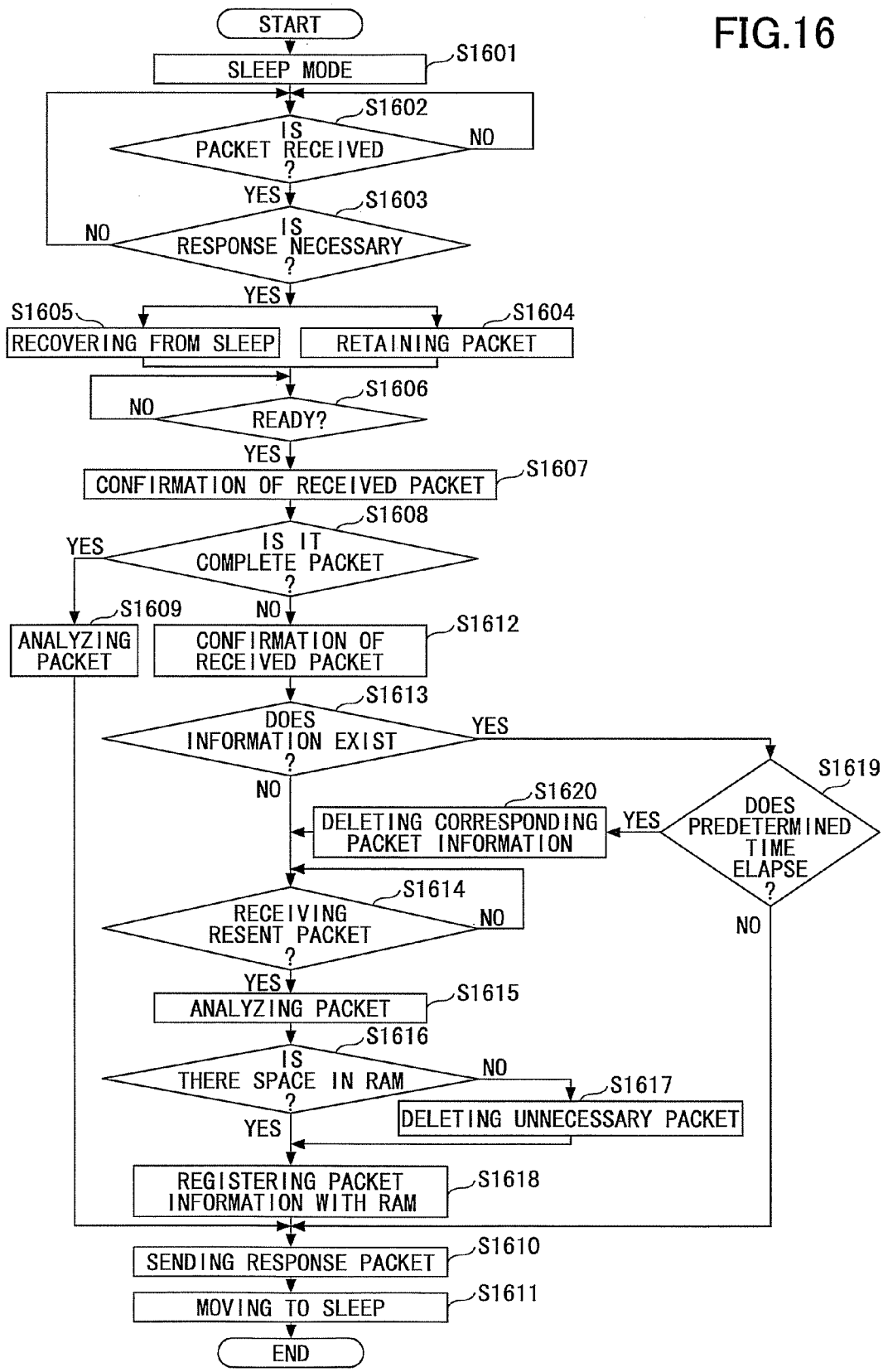
FIG. 16 illustrates an operation of an SoC of Embodiment 4.

FIG. 16 illustrates an operation of the SoC of Embodiment 4. The process between step S1601 and step S1615 in FIG. 16 is similar to the process between step S1401 and step S1415 in FIG. 14. Therefore, a description is omitted.

In step S1615, the corresponding response packet is determined by analyzing the resent complete packet. Thereafter, the packet analyzing unit 660A determines whether a space exists in the packet list area 232 of the RAM 230 in step S1616.

When there is no space in NO of step S1616, the packet analyzing unit 660A deletes an unnecessary packet information piece from the packet list 60C in step S1617. Thereafter, the process goes to step S1618. With Embodiment 4, the unnecessary packet information piece is a packet information piece of which frequency of using is low. The packet analyzing unit 660A deletes the packet information piece of which frequency of using is the lowest in the packet list 60C stored in the packet list area 232 as the unnecessary packet information piece. A predetermined number of packet information pieces may be deleted in an order from the packet information piece where frequency of use is lower to the packet information piece of which frequency of using is higher. With Embodiment 4, the oldest packet information piece which has been registered may be deleted as the unnecessary information piece.

If the space exists in step S1616, the packet information piece is stored in the packet list 60C in step S1618. Then, the process goes to step S1610.

Because steps S1619 and S1620 illustrated in FIG. 16 are similar to steps S1417 and S1418 illustrated in FIG. 14, description of these are omitted.

As described, with Embodiment 4, even if the space does not exist in the packet list area 233, it is possible to secure the packet list area 223 by deleting the unnecessary packet information.

Effect of the Invention

As described, with Embodiments of the present invention, a quick response after a recovery of a CPU is enabled while reducing power consumption.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-202996 filed on Sep. 10, 2010 and Japanese Priority Patent Application No. 2010-258662 filed on Nov. 19, 2010, the entire contents of which are hereby incorporated herein by reference.

What is claimed is:

1. An information processing apparatus comprising:
a receiving part configured to receive a packet from a communication line;
an arithmetic processing part configured to stop an operation in an energy conservation mode;
a filter part configured to allow a packet, to which a response is required, to pass through the filter part;
a packet retaining part configured to retain the packet passing over the filter part; and
a power source administrating part configured to activate the arithmetic processing part by supplying electric power to the arithmetic processing part when the packet is received by the receiving part,
wherein if the packet retaining part retains an incomplete packet, a portion of which is lost, at a time of activating the arithmetic processing part, the arithmetic processing part generates a packet information piece, in which the incomplete packet and a corresponding complete packet containing the incomplete packet are associated, as a list, and stores the list to a list storing part, and
wherein, if the packet retaining part retains the incomplete packet at the time of activating the arithmetic processing part, when the list storing part stores the packet information piece for the incomplete packet, the arithmetic processing part generates another packet information piece, in which the incomplete packet and a corresponding response packet containing the incomplete packet are associated, as the list, and stores the list to the list storing part and the arithmetic processing part sends the response packet corresponding to the incomplete packet by referring to the packet information.

2. The information processing apparatus according to claim 1,
wherein, if the packet retaining part retains the incomplete packet at the time of activating the arithmetic processing part, the packet information piece is generated when the complete packet containing the incomplete packet is received by the receiving part.

3. The information processing apparatus according to claim 2,
wherein, if the packet retaining part retains the incomplete packet at the time of activating the arithmetic processing part, when the list storing part stores the packet information piece for the incomplete packet, the arithmetic processing part responds to the complete packet corresponding to the incomplete packet by referring to the packet information piece.

4. The information processing apparatus according to claim 1,
wherein the packet information piece contains time information indicating a time when the packet information piece is stored in the list storing part.

5. The information processing apparatus according to claim 1,
wherein the packet information piece contains frequency information indicating a frequency that the arithmetic processing part uses the packet information piece.

6. The information processing apparatus according to claim 1,
wherein the list storing part has a self refresh function for storing the list in the energy conservation mode.

7. The information processing apparatus according to claim 1, further comprising:
a packet information number setting part configured to set a number of packet information pieces stored in the list.

8. An information processing method carried out by an information processing apparatus including a receiving part configured to receive a packet from a communication line, an arithmetic processing part configured to stop an operation in an energy conservation mode, and a filter part configured to allow a packet, to which a response is required, to pass through the filter part, the information processing method comprising:
retaining the packet passing over the filter part; and
activating the arithmetic processing part by supplying electric power to the arithmetic processing part when the packet is received by the receiving part,
wherein, if the packet retaining part retains an incomplete packet, a portion of which is lost, at a time of activating the arithmetic processing part, generating with an arithmetic processing part a packet information piece, in which the incomplete packet and a corresponding complete packet containing the incomplete packet are associated, as a list, and storing the list to a list storing part, and
wherein, if the retaining retains the incomplete packet at the time of activating the arithmetic processing part, when the list storing part stores the packet information piece for the incomplete packet, the arithmetic processing part generates another packet information piece, in which the incomplete packet and a corresponding response packet containing the incomplete packet are associated, as the list, and stores the list to the list storing part and the arithmetic processing part sends the response packet corresponding to the incomplete packet by referring to the packet information.

9. The information processing method according to claim 8,
wherein, if the retaining retains the incomplete packet at the time of activating the arithmetic processing part, the packet information piece is generated when the complete packet containing the incomplete packet is received by the receiving part.

10. The information processing method according to claim 9,
wherein, if the retaining retains the incomplete packet at the time of activating the arithmetic processing part, when the list storing part stores packet information piece for the incomplete packet, the arithmetic processing part responds to the complete packet corresponding to the incomplete packet by referring to the packet information piece.

11. A non-transitory, computer readable medium for an information processing apparatus including a receiving part configured to receive a packet from a communication line, an arithmetic processing part configured to stop an operation in an energy conservation mode, and a filter part configured to allow a packet, to which a response is required, to pass through the filter part, which stores a computer program containing instructions executable by a processor to perform:
retaining the packet passing over the filter part; and
activating the arithmetic processing part by supplying electric power to the arithmetic processing part when the packet is received by the receiving part; and
wherein, if the packet retaining part retains an incomplete packet, a portion of which is lost, at a time of activating the arithmetic processing part, generating with an arithmetic processing part a packet information piece, in which the incomplete packet and a corresponding complete packet containing the incomplete packet are associated, as a list, and storing the list to a list storing part, and
wherein, if the retaining retains the incomplete packet at the time of activating the arithmetic processing part, when the list storing part stores the packet information piece for the incomplete packet, the arithmetic processing part generates another packet information piece, in which the incomplete packet and a corresponding response packet containing the incomplete packet are associated, as the list, and stores the list to the list storing part and the arithmetic processing part sends the response packet corresponding to the incomplete packet by referring to the packet information.

12. The non-transitory, computer readable medium according to claim 11,
wherein, if the retaining retains the incomplete packet at the time of activating the arithmetic processing part, the packet information piece is generated when the complete packet containing the incomplete packet is received by the receiving part.

13. The non-transitory, computer readable medium according to claim 12,
wherein, if the retaining retains the incomplete packet at the time of activating the arithmetic processing part, when the list storing part stores packet information piece for the incomplete packet, the arithmetic processing part responds to the complete packet corresponding to the incomplete packet by referring to the packet information piece.

* * * * *